United States Patent

Shirai et al.

Patent Number: 5,534,210
Date of Patent: Jul. 9, 1996

[54] METHOD OF TAKING OUT A FIBER BUNDLE AND METHOD OF MANUFACTURING A RESIN STRUCTURE REINFORCED WITH LONG FIBERS

[75] Inventors: Yoshimitsu Shirai, Shizuoka; Haruji Murakami; Takeshi Amaike, both of Fuji, all of Japan

[73] Assignee: Polyplastics Co., Ltd., Japan

[21] Appl. No.: 377,214

[22] Filed: Jan. 23, 1995

[30] Foreign Application Priority Data

Jan. 26, 1994 [JP] Japan ................................. 6-023808

[51] Int. Cl.⁶ ........................... B29C 47/02; B29C 70/20; B29C 70/28
[52] U.S. Cl. .................................. 264/171.130; 242/555; 242/556; 264/171.14; 264/171.15; 264/171.23; 264/171.24
[58] Field of Search ............................. 264/174, 171.13, 264/171.14, 171.15, 171.23, 171.24; 242/555, 556

[56] References Cited

U.S. PATENT DOCUMENTS 3,993,726   11/1976   Moyer ............................ 264/171.13 X

FOREIGN PATENT DOCUMENTS 51-19843    2/1976   Japan .
57-181852   11/1982  Japan .
5-84838     4/1993   Japan .

OTHER PUBLICATIONS

Translation of Japan 5-84,838 (Published Apr. 6, 1993).

Primary Examiner—Leo B. Tentoni
Attorney, Agent, or Firm—Nixon & Vanderhye

[57] ABSTRACT

A method of continuously taking out a twist-free fiber bundle from the inner side of a plurality of fiber bundle packages each having a hollow cylindrical shape is disclosed. The trailing end of a fiber bundle package and the leading end of another fiber bundle package are spliced to each other in advance. The plurality of fiber bundle packages thus spliced are attached to a body of revolution, and a fiber bundle is then taken out at a speed which is determined based on the taking-out speed of the fiber bundle in a direction so as to eliminate twist of the fiber bundle thus taken out while the rotary member is rotated. Also disclosed is a method of manufacturing a resin structure reinforced with long fibers using the thus prepared twist-free fiber bundle by impregnating it with a resin while drawing.

3 Claims, 2 Drawing Sheets

METHOD OF TAKING OUT A FIBER BUNDLE AND METHOD OF MANUFACTURING A RESIN STRUCTURE REINFORCED WITH LONG FIBERS

BACKGROUND OF THE INVENTION

1. Field of the Invention

The present invention relates to a method of continuously taking out a twist-free fiber bundle from a cylindrically wound fiber bundle (hereinafter referred to as a fiber bundle package, or more simply, a package) and to a method of manufacturing a resin structure reinforced with long fibers using the thus obtained fiber bundle. More particularly, the invention relates to a method of manufacturing a resin structure reinforced with long fibers in which twisting of a fiber bundle is effectively eliminated, the twisting occurring when the bundle is taken up from the inner side of a plurality of fiber bundle packages each having a hollow cylindrical shape, and the resulting twist-free fiber bundle is impregnated with a resin, thereby eliminating frequent interruption of the manufacture for supplying a starting fiber bundle, achieving a uniform impregnation of the resin into the fiber bundle, and facilitating the manufacture of a resin structure reinforced with long fibers with high strength and consistent properties.

2. Description of the Related Art

Elongated resin structures reinforced with fibers in which thermoplastic resins are reinforced with continuous fibers have mechanical properties much superior to those of structures reinforced with short fibers, and are beneficial because they can be cut and formed into pellets or similar materials. Due to these advantageous features, they have recently become of particular interest. Elongated thermoplastic resin structures reinforced with fibers are generally manufactured by the so-called pultrusion method by impregnating a thermoplastic resin into a continuous fiber bundle for reinforcement while the bundle is passed through a cross-head extrusion die, after which the resin-impregnated fiber bundle is drawn out through the die (U.S. Pat. No. 3,993,726), or by drawing a continuous fiber bundle for reinforcement through a thermoplastic resin melt to wet the bundle and pulling out the wet bundle through a die (Japanese Patent Application Laid-open (kokai) No. 57-181,852). After undergoing the pultrusion method, the structures are cut to a desired size.

Other types of reinforced structures are obtained by reinforcing thermosetting resins with continuous fibers by various methods. For example, in the so-called filament winding method, fibers such as glass roving are coated with a resin before the resin has set and wound around a rotating frame while applying tension, and then the resin is allowed to set. In the preforming method, a semi-set prepreg is formed. In the pultrusion method, profile extrusion is first performed, after which the extruded product is completely set.

In the manufacture of these resin structures reinforced with long fibers, regardless of whether a thermoplastic resin or a thermosetting resin is used, it is required that a matrix resin be sufficiently impregnated into continuous fiber bundles, and it is important that a matrix resin be uniformly impregnated into the fiber bundles in order to obtain good mechanical properties of the resulting resin structures as well as a good appearance of the final product. To this end, it is a general practice that a fiber bundle which has been bound is loosened while passing through tension bars or rolls under tension, and the loosened fiber bundle is impregnated with a molten or liquid-state resin. In this process, twisting in the fiber bundle causes insufficient loosening of the fiber bundle, which results in uneven impregnation of a resin melt. Moreover, twisting causes easy breakage of fibers of a fiber bundle in a fiber-loosening step, etc. Therefore, twisting must be avoided.

In the manufacture of resin structures reinforced with fibers as described above, bundles of fibers for reinforcing the resin structure are generally supplied as roving packages or similar materials in which monofilaments with a diameter of 4 to 25 micrometers such as glass fibers, carbon fibers, metallic fibers, or organic fibers are bound with a suitable sizing agent to be flat.

The fiber bundle is taken out from the above package before the bundle is impregnated with a resin by either a taking-from-outside method or a taking-from-inside method. In the taking-from-outside method, a fiber bundle is taken out from the outer circumference of the cylindrical package while the package is rotated. Although this method is advantageous in that the fiber bundle does not twist, increased loads are applied to the fiber bundle because the package itself is rotated, causing nappy splits as a result of breakage of fibers. In addition, when the fiber bundle is released from the package, some fibers tends to remain on the package, resulting in the problem of poor releasability.

By contrast, according to the taking-from-inside method, a fiber bundle is taken out from the inner circumference of the cylindrical package, and lower loads are applied to the fiber bundle which are taken out. Moreover, because a protective cover can be used to prevent crumbling and pollution of the package, it is said that this method is advantageous from the standpoint of workability. Releasability is good, too. However, this method has the drawback that one twist is applied to the fiber bundle after one loop of the fiber bundle is removed from the inner circumference of the package, when the fiber bundle is removed from the inner side of the package which is fixed to a support. Occurrence of twisting in a fiber bundle results in insufficient fiber-loosening, accompanied by insufficient and uneven impregnation with a resin in the manufacture of resin structures reinforced with long fibers, and breakage of fibers in a fiber-loosening step or the like, leaving nappy splits.

Japanese Patent Application Laid-open (kokai) No. 5-84,838 discloses a method of eliminating twisting of a fiber bundle when the bundle is taken from the inside of a package. The method uses an apparatus which contains a table rotatably supported by a frame, a guide roll which is provided in a protruding manner at the center of a table, a tension sensor which is provided in the guide roll for detecting the tension of the fiber bundle applied to the guide roll, and a rotation driving means for rotating the table according to the signal detected by the tension sensor. According to the method of this publication, the tension generated in the fiber bundle when it is taken up from a hollow cylindrical package to the outside is detected, and based on the detected signals, the table is intermittently or continuously rotated in the direction opposite to the direction of rewinding of the fiber bundle to continuously take out a fiber bundle. This method, however, leaves room for improvement since the apparatus is rather complicated, and problems are involved when fiber bundles are continuously drawn out from a plurality of cylindrical fiber bundles.

SUMMARY OF THE INVENTION

Accordingly, an object of the present invention is to provide a method of continuously drawing out an untwisted fiber bundle from the inner circumference of a plurality of cylindrical fiber bundle packages over prolonged periods using a simple apparatus.

In more detail, the method comprises continuously drawing out a fiber bundle from the inner side of a plurality of fiber bundle packages each having a hollow cylindrical shape, wherein the trailing end of the fiber bundle package and the leading end of another fiber bundle package are spliced to each other in advance, the plurality of fiber bundle cylindrical packages thus spliced are attached to a body of revolution, and the fiber bundle is taken out at a speed determined in accordance with the removal speed of the fiber bundle and in a direction which eliminates twist of the fiber bundle removed while the body of revolution is rotated.

Another object of the present invention is to provide a method of manufacturing a resin structure reinforced with long fibers which has high strength and consistent properties and in which a fiber bundle is uniformly impregnated with a resin.

In more detail, the method of manufacturing a resin structure reinforced with long fibers comprises continuously taking out a fiber bundle from the inner side of a plurality of cylindrical fiber bundle packages each having a hollow cylindrical shape, and impregnating the fiber bundle with a resin while the fiber bundle is drawn, wherein the trailing end of a fiber bundle package and the leading end of another fiber bundle package are spliced to each other in advance, the plurality of fiber bundle packages thus spliced are attached to a body of revolution, and a fiber bundle is taken out at a speed determined based on the taking-out speed of the fiber bundle and in the direction so as to eliminate twist of the fiber bundle thus taken out while the body of revolution is rotated.

The above objects, features and advantages of the present invention will become apparent from the following description.

Figure 1:
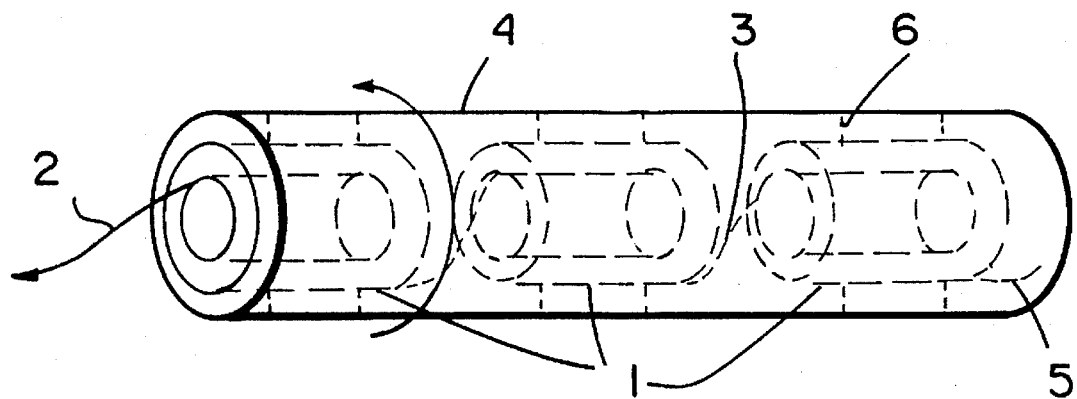
FIG. 1 is a schematic illustration showing an example of a method of continuously drawing out a twist-free fiber bundle according to the present invention in which a cylindrical body of revolution is used.

Fig, 4 is a schematic illustration showing an example of the method of manufacturing a resin structure reinforced with long fibers according to the present invention.

DESCRIPTION OF PREFERRED EMBODIMENTS

There is no limitation on the kind of fiber in the fiber bundle which is used for making a cylindrical fiber bundle package or manufacturing a resin structure reinforced with long fibers in the present invention. For example, fibers with a high melting point such as glass fibers, carbon fibers, metallic fibers, aromatic polyamide fibers, and the like can be used. These fibers may be treated with a known surface-treating agent (binder).

The present invention provides a method of taking out a fiber bundle from the inner circumference of a cylindrical fiber bundle made up of the above-described fibers and taken up to form a hollow cylindrical shape such as a roving package. The invention also provides a method of manufacturing a resin structure reinforced with long fibers in which the thus taken-out fiber bundle is impregnated with a resin. In the present invention, when a fiber bundle is continuously drawn out from the inner side of a plurality of packages each having a hollow cylindrical shape, the trailing end of the fiber bundle of a package and the leading end of the fiber bundle of the next package are spliced to each other in advance, the plurality of hollow cylindrical packages thus spliced are attached to a body of revolution, and the fiber bundle is taken out while the body of revolution is rotated at a speed which corresponds to the removal speed of the fiber bundle in the direction which eliminates twist of the fiber bundle thus removed. It is noted that a plurality of hollow cylindrical packages are securely mounted in the body of revolution, and the packages are connected usually by splicing the end of the fiber bundle on the outer circumference of a hollow cylindrical package and the end of the fiber bundle on the inner circumference of a hollow cylindrical package which is to be drawn next. The spliced portion must have enough strength not to break when the fiber bundle is drawn. Especially in the case where a resin structure reinforced with long fibers is manufactured, since a continuous fiber bundle is pulled from the rear side and allowed to pass through a tension bar for loosening the bundle, and the loosened fiber bundle is impregnated with a resin with a cross-head die, the spliced portion must be strong so as not to rupture when it passes through the above steps. The fiber bundles are spliced by known methods which include the use of compressed air streams for combining ends of fiber bundles placed one on another as described in Japanese Patent Application Laid-open (kokai) No. 51-19,843. The apparatus which is used for this method of splicing is generally known as an air splicer.

There is no particular limitation as to the shape of the body of revolution onto which a plurality of packages connected to each other by splicing the trailing end and the leading end of fiber bundles as described above are mounted. For example, the body of revolution may be cylindrical or box-shaped, or it may have a shape of a turntable on which the packages can be mounted. Since the body rotates, suitable shapes for rotation such as cylindrical or disk-like turntables are preferred. When a hollow cylindrical body of revolution is used, the inner capacity preferably permits as many packages as possible to be contained so that the fiber bundle may be continuously taken out for a prolonged period. Also, the hollow cylindrical body preferably has a radius slightly greater than that of the package contained therein, and the axis of the cylinder is horizontally positioned. A plurality of the connected packages are horizontally laid in the order of connection, and put into the cavity of the body of revolution and secured to the body. The method of loading the packages onto the body of revolution is not particularly limited as long as the packages contained inside the body do not rotate with respect to the body when the body of revolution rotates and the fiber bundle can be continuously taken out smoothly. For example, a fixing member such as a pin which is movable from the outside to the inside of the body of revolution can be used. When a turntable on which packages are placed is used, no fixing member is required because the packages are generally maintained in place by their own weight. However, a fixing member may be used. For the same reason as described above, the turntable preferably has as large a surface as possible so that many packages can be placed thereon.

The body of revolution by which a plurality of connected packages are supported is rotated in the direction which eliminates twisting which occurs during rewinding of the fiber bundle. In the case where packages are securely mounted in a hollow cylindrical body of revolution with the axis of the body and that of the packages being identical, the direction of rotation is opposite to the direction of rewinding of the packages. Depending on the manner in which the packages are loaded, the direction of rotation must be determined and changed each time the package from which a fiber bundle is taken out is changed. This is cumbersome, and therefore, it is preferred that when a hollow cylindrical body of revolution is used, the packages be aligned in the order of splicing and placed in the cylindrical body so that the axes of the cylinder and the packages are generally on the same line, the radius of the body being slightly greater than that of the packages, and that the cylindrical body be rotated about the cylindrical axis. In the case where a turntable is used, the packages are preferably arranged in the circumferential direction of the table surface in the order of splicing. The longitudinal axes of the packages are preferably vertical to the table surface.

The speed of rotation of the body of revolution is set in accordance with the speed of removing a fiber bundle. Generally, the speed is changed as desired. Generally, the packages have a predetermined wound-up thickness of fiber bundle, and therefore, the number of twists per unit of removed length shifts as the fiber bundle is taken out from the inner side for the first time while proceeding to the outside of the package. Thus, the speed of rotation is preferably changed so that the twisting is always eliminated in response to both the change of the taking-out speed and the change of the speed at which twisting occurs, which change is inevitable even though the taking-out speed is constant.

Figure 2:
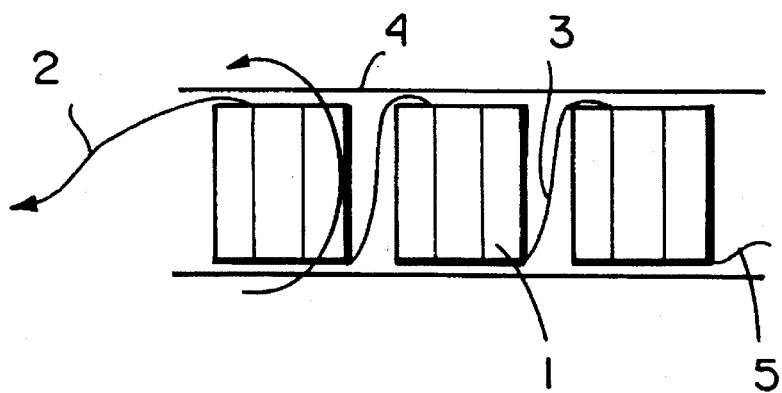
FIG. 2 is a schematic illustration showing another example of a method of continuously drawing out a twist-free fiber bundle according to the present invention in which a cylindrical body of revolution is used.
Figure 3:
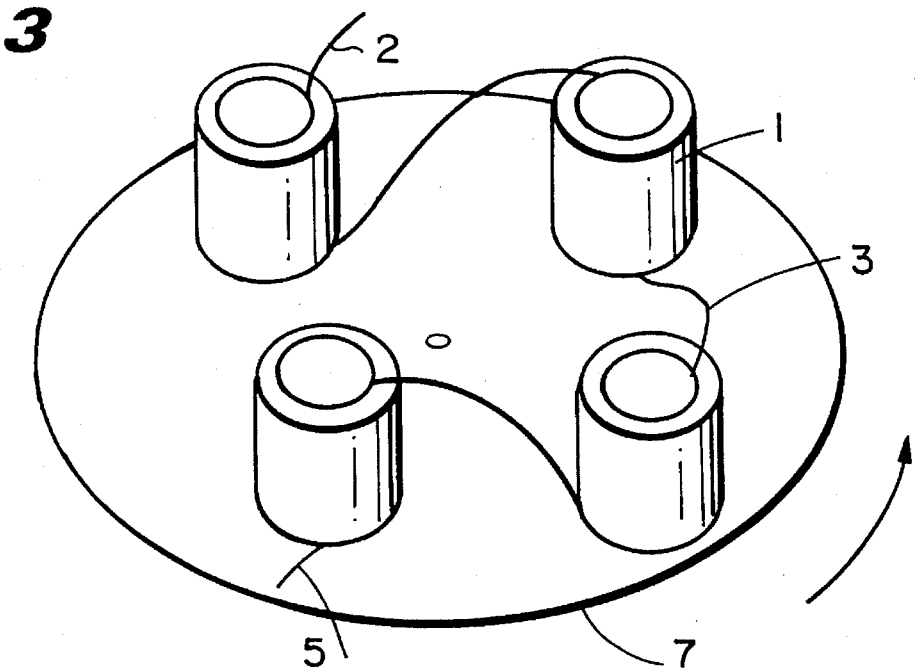
FIG. 3 is a schematic illustration showing an example of a method of continuously drawing out a twist-free fiber bundle according to the present invention in which a turntable is used.

The present invention will next be described referring to examples shown in the accompanying drawings. FIG. 1 shows a hollow cylindrical body of revolution and a plurality of packages secured therein. In FIG. 1, reference numeral 1 indicates a fiber bundle package, numeral 2 is a fiber bundle with no twist which has been taken out, numeral 3 is a point of splicing of fiber bundles, numeral 4 is a hollow cylindrical body of revolution (the rotation driving means therefor is not shown), numeral 5 is the trailing end of the fiber bundle, and numeral 6 is a fixing member. In FIG. 1, the longitudinal axis of each package i and that of the body of revolution coincide with each other. In FIG. 2, the packages are contained in and fixed to the hollow cylindrical body of revolution so that the longitudinal axes of packages are vertical to the longitudinal axis of the body of revolution 4. In FIG. 2, fixing members are not shown. In FIGS. 1 and 2, 3 packages are housed in a hollow cylindrical body of revolution, and therefore, the fiber bundle can be continuously taken out until the fiber bundle comes to the end of the third package. When the fiber bundle 2 is completely taken out from the three packages, it is necessary that the rotation of the body of revolution be terminated and a new set of connected packages be placed therein. Even though the number of packages housed in a body of revolution can be increased, interruption of taking out of a fiber bundle cannot be avoided sooner or later. In the manufacture of resin structures reinforced with long fibers which will be described later using the thus taken out fiber bundle, the interruption needed for setting up the new set of packages is a considerable time loss. In order to avoid this interruption, it is necessary that the trailing end of the last package and the leading end of the package which is the next one to be contained in the body of revolution 4 be spliced before using all the packages contained in the body of revolution 4, or the placement and fixing of the new set be carried out while splicing. If the aforementioned air splicer is used, the time needed for splicing is generally within 1 second. Therefore, use of an auxiliary body of revolution and a rotary air splicer (both not shown) makes it possible to easily carry out the splicing with a leading end of a new package and to securely load the new package in the body of revolution 4 while the body of revolution is continuously rotated. As a result, interruption is avoided and a fiber bundle with no twist can be continuously taken out for a prolonged period. FIG. 3 shows an example in which a turntable is used as a body of revolution. Four packages are placed generally along the periphery of the table. In this case, operation is continued until the packages placed on the tables are all empty.

The thus obtained fiber bundle which is taken out without having substantial twisting is loosened preferably with tension rolls, tension bars, etc. Subsequently, it is impregnated with a resin or a similar material. The method of impregnation is not particularly limited, and any known methods for impregnation such as methods using impregnation dies and impregnation tanks may be used.

In the present invention, thermoplastic resins and thermosetting resins are both useful as the resins for impregnating a fiber bundle. Examples of the thermoplastic resins include polyolefins such as polyethylene and polypropylene, polyesters such as polyethylene terephthalate and polybutylene terephthalate, polyamides such as nylon 6, nylon 66, nylon 11, nylon 12, nylon 610 and nylon 612, other thermoplastic resins such as polyacetals, polycarbonates, thermoplastic polyurethanes, polyphenylene sulfides, polyphenylene oxides, polysulfones, polyetherketones, polyetheramides and polyetherimides, and combinations of these. Examples of the thermosetting resins include unsaturated polyesters, epoxy resins, thermosetting polyurethanes, and prepolymers of these. In view of the ease in processing of the resulting resin structures reinforced with long fibers, use of thermoplastic resins for impregnating fiber bundles is preferred. The impregnation is preferably carried out using an impregnation die, particularly a crosshead die, in view of ease of operation.

The continuous fiber bundle which has been impregnated with a thermoplastic resin melt is given a shape such as a strand, a bar, a ribbon, a tape, a sheet, a plate, or another special shape by allowing it to pass through a shaping die, etc. Subsequently, the shaped bundle is taken up by take-off equipment. The resin structure reinforced with Long fibers which is thus obtained is used as is or is cut to an arbitrary length and used as pellets, etc. for molding or for another processing step.

Figure 4:
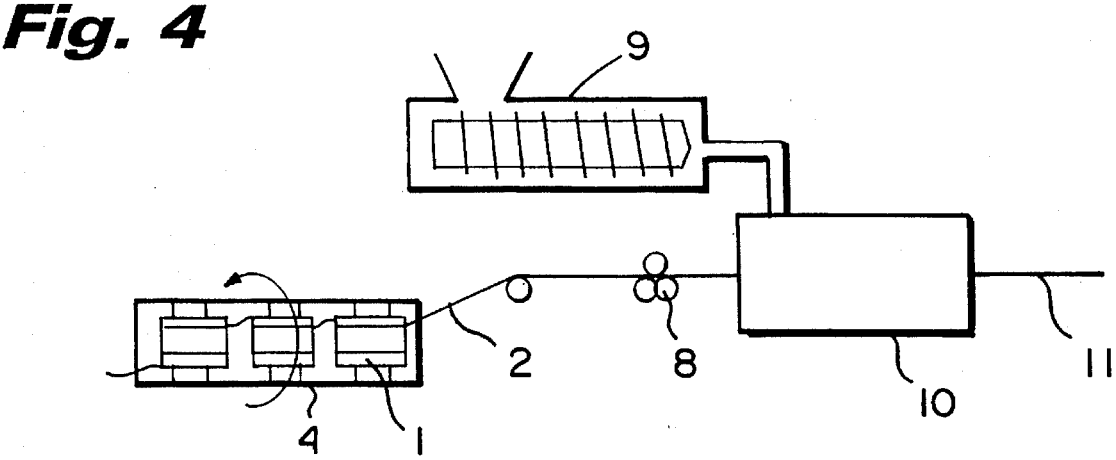

FIG. 4 shows a method of manufacturing a resin structure reinforced with long fibers by drawing a fiber bundle 2, which has no twists and which is taken out through a step shown in FIG. 1 with a drawing means which is not shown, and by impregnating the bundle with a thermoplastic resin. This method is applicable to the fiber bundles taken out by the methods shown in FIGS. 2 and 3. In FIG. 4, reference numeral 8 indicates a tension bar, numeral 9 indicates an extruder for supplying a thermoplastic resin melt, numeral 10 is a cross-head die for impregnating the fiber bundle 2 with the thermoplastic resin melt, and numeral 11 is a fiber bundle which is impregnated with the thermoplastic resin. In FIG. 4, the twist-free fiber bundle is supplied to the tension bar and the cross-head die from one body of revolution.

However, it is also possible for a number of twist-free fiber bundles to be taken out simultaneously from a plurality of bodies of revolution and supplied in a manner similar to that shown in FIG. 4.

There is no particular limitation with respect to the composition (amount of the fibers, etc.) of the thus obtained resin structure reinforced with Long fibers. In view of the physical properties of the obtained structure, the fiber may be from 20 to 80% by weight of the total weight of the structure. The range from 30 to 70% by weight is particularly preferred.

The resin structure reinforced with long fibers according to the present invention may optionally contain a variety of additives which are routinely added to resins as desired. Examples of such optional additives include antioxidants, UV absorbers, antistatics, lubricants, plasticizers, mold release agents, flame-retardants, flame-retarding adjuvants, colorants, inorganic fillers, and organic fillers.

EXAMPLES

The present invention will further be described in detail by way of examples, which should not be construed as limiting the invention.

Example 1

Three packages (hollow cylindrical shape) of glass fibers with 2,200 Tex were secured inside a hollow cylindrical body of revolution as shown in FIG. 1, and the trailing end and the leading end of the fiber bundles of the packages were spliced with an air splicer. A continuous twist-free fiber bundle was taken out at a constant speed. Using an apparatus shown in FIG. 4, the fiber bundle was continuously impregnated with polypropylene melt for 45 hours. The impregnated fiber bundle was passed through a shaping die and a pelletizer, which are not shown, to obtain a pelletized resin structure reinforced with long fibers (pellet length: 10 mm). Samples of the pellets thus prepared were taken 5 times immediately after manufacture at intervals of 10 hours. Each sample was processed with an injection molding machine to prepare a test piece for investigating the variation of tensile strength. As a result, it was found that the tensile strengths were sequentially 1,460, 1,460, 1,470, 1,480 and 1,470 kg/cm$^2$, revealing consistent tensile strength within the limit of error. In a similar manner, a test piece for evaluating glass fiber distribution (300 mm×200 mm×2 mm) was formed, and the number of glass fibers (or glass fiber bundles) which were visually recognized through the surface and which had a length longer than 1.0 mm was counted. The counts were 3.3, 4.0, 3.2, 3.0 and 3.7, respectively, at the 5 points in time, and thus were constant within the limit of error.

Comparative Example 1

The procedure of Example 1 was repeated except that one package identical to those used in Example 1 was secured atop a turntable shown in FIG. 3 at its center. A continuous twist-free fiber bundle was taken out at a constant speed to obtain a pelletized resin structure reinforced with long fibers. Samples were collected in a manner similar to that described in Example 1. The tensile strength were 1,480 and 1,450 kg/cm$^2$ at two sequential points in time, revealing a consistent tensile strength within the limit of error. The counts for glass fiber distribution were 3.2 and 4.2 at the two points in time, and thus were constant within the limit of error. The period of time during which a stable and continuous operation was carried out was 15 hours. In order to restart the operation, the next roving to be loaded was prepared, the impregnation die was opened to clean the die by removing the residual resin, and then the roving was set. 5 hours was required for all these operation. As a result, 55 hours in total was required before obtaining the final product in the same amount as in Example 1.

As described above, according to the present invention, considerable time losses are eliminated by using a simple apparatus, and a twist-free fiber bundle can be taken out continuously over a prolonged period. Moreover, the present invention has a high industrial value because the thus obtained twist-free fiber bundle can be uniformly impregnated with a resin, and thus a resin structure reinforced with long fibers which has high strength and consistent properties can be obtained.

What is claimed is:

1. A method of manufacturing a resin structure reinforced with long fibers comprising continuously taking out a twist-free fiber bundle from an inner side of a plurality of fiber bundle packages each having a hollow cylindrical shape, and impregnating the fiber bundle with a resin while the fiber bundle is drawn, wherein the trailing and of the fiber bundle package and the leading end of another fiber bundle package are spliced to each other in advance, and wherein the plurality of fiber bundle packages thus spliced are attached to a body of revolution, which is one of:

(1) a cylindrical body having a radius larger than that of the fiber bundle packages so that longitudinal axes of said plurality of fiber bundle packages are aligned along a longitudinal axis of the cylindrical body of revolution in which the plurality of fiber bundle packages are secured in order of splicing, and the cylindrical body of revolution being rotated about its axis, and (2) a turntable on which said plurality of spliced fiber bundle packages are placed and the turntable being rotated for taking out the fiber bundle, and wherein the fiber bundle is taken out at a speed which is determined based on the taking-out speed of the fiber bundle and in a direction eliminating twist of the fiber bundle thus taken out while the body of revolution is rotated.

2. The method according to claim 1, in which the step of splicing is carried out by an air splicer.

3. The method according to claim 1, in which the fiber bundle is impregnated with a resin by a cross-head die.

* * * * *